Sept. 14, 1965    G. L. BOCK ETAL    3,206,224
TRAILER HITCH
Filed Oct. 28, 1963    3 Sheets-Sheet 1
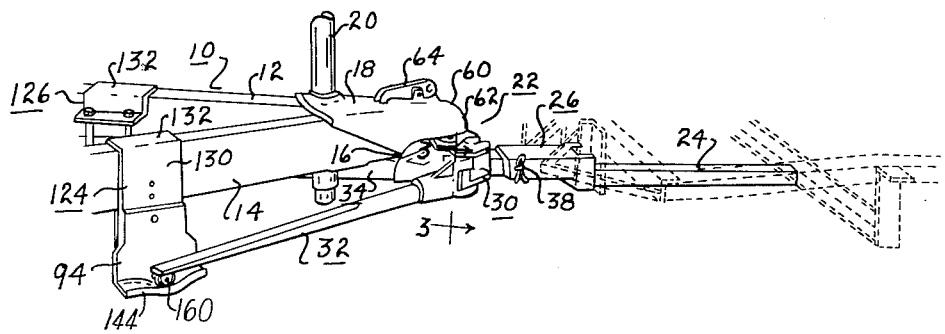
FIG. 1
FIG. 2
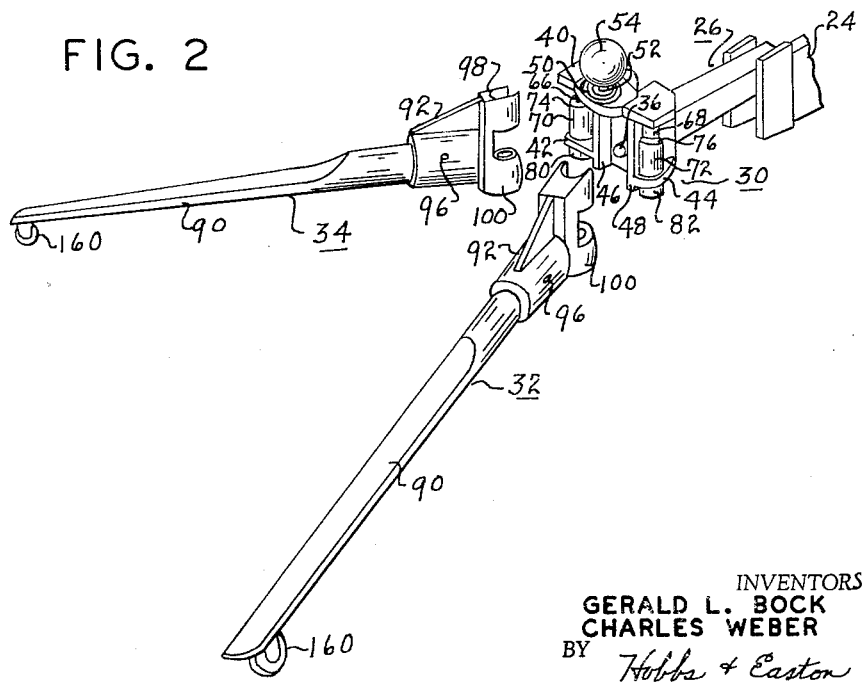
INVENTORS
GERALD L. BOCK
CHARLES WEBER
BY Hobbs & Easton
ATTORNEYS INVENTORS
GERALD L. BOCK
CHARLES WEBER
BY *Hobbs & Easton*
ATTORNEYS Sept. 14, 1965

G. L. BOCK ETAL 3,206,224

TRAILER HITCH

Filed Oct. 28, 1963

INVENTORS
GERALD L. BOCK
CHARLES WEBER
BY Hobbs & Easton
ATTORNEYS

United States Patent Office 3,206,224
Patented Sept. 14, 1965

3,206,224
TRAILER HITCH
Gerald L. Bock and Charles Weber, Elkhart County, Ind., assignors to Elkhart Welding and Boiler Works, Inc., Elkhart, Ind., a corporation of Indiana
Filed Oct. 28, 1963, Ser. No. 319,476
6 Claims. (Cl. 280—406)

The present invention relates to trailer hitches, and more particularly to trailer hitches having load equalizing and stabilizing mechanisms forming a part thereof.

Within the last few years, mobile homes, house trailers and similar vehicles have been increased in length to the extent that the conventional single pair of wheels or a tandem wheel undercarriage located to the rear of the center of the vehicle places an excessive amount of weight on the rear end of the towing vehicle. With conventional trailer hitches connected to the front end of the trailer and to a draw bar on the towing vehicles, the front end of the trailer and the rear part of the towing vehicle sag, placing an undue load on the rear wheels of the towing vehicle and causing the trailer to assume a forwardly tilted position. Various types of devices have been used in the past to overcome this difficulty, a number of which include a single or dual bar attached to the trailer hitch and extending rearwardly from the towing vehicle beneath or along the side of the forward end of the trailer frame. These bars are resilient and are usually connected to the trailer frame by a yieldable coupling means, which together permit some flexing to occur between the trailer and towing vehicle at the hitch. These prior load equalizing mechanisms have had certain inherent disadvantages which have rendered them unsatisfactory, inconvenient to use and/or even dangerous under certain road conditions or driving maneuvers, including difficulty in installing and removing them from the hitch and trailer, complicated structures rendering them difficult to fabricate, assemble and properly adjust, and accidental unhitching or displacement from the vehicles while the trailer is being towed. Further, while the towing vehicle and trailer are traveling at relatively high rates of speed and turning to either side, the trailer may sway and rock from side-to-side, thus causing the operator of the towing vehicle to lose control of the vehicles. This latter condition may also be created between the trailer and a passing semi-trailer truck, for example, while both vehicles are traveling at a relatively high rate of speed. It is therefore one of the principal objects of the present invention to provide a load equalizing hitch for connecting a trailer to a towing vehicle, which is so constructed and arranged that side-to-side swaying and rocking are effectively minimized or completely prevented, without interfering with the normal operation of the load equalizing feature of the hitch.

Another object of the invention is to provide a load equalizing and vehicle stabilizing hitch of the aforesaid type in which the hitch can be fully assembled in operating position between the two vehicles and readily removed therefrom with a relatively few simple operations, and which, once installed in proper operating condition on the vehicle, remains permanently attached thereto until intentionally removed when the two vehicles are disconnected.

Another object of the invention is to provide a trailer hitch having a load equalizing mechanism therein, which gives maximum road clearance and does not form an obstruction interfering with the viewing of the license plate, and which can be rigidly connected to an automobile by a draw bar of simple and conventional design.

Still another object of the invention is to provide a relatively simple, strong and compact trailer hitch having a load equalizing mechanism therein, which can be readily fabricated and assembled and which can be easily installed on an automobile and trailer at any angle and without the use of special tools or equipment, and by one operator without any special skill or training.

A further object is to provide a load equalizing mechanism of the aforesaid type, having a pair of readily detachable spring bars pivotally connected at one end to the trailer hitch by a socket construction forming a part of the bars and connected at the other end to the trailer frame by a trough-like support structure, so that when the bars are removed from the vehicles, the hitch can be used as a simple conventional hitch without any interference from the fixtures used in mounting the bars on the vehicles and without any protuberances or the like detracting from the appearance of the hitch.

Additional objects and advantages of the present invention will become apparent from the following description and accompanying drawings, wherein:

FIGURE 1 is a perspective view of the present load equalizing trailer hitch showing it mounted on a draw bar and connected to the forward frame members of a trailer;

FIGURE 2 is a perspective view of the load equalizing hitch shown in FIGURE 1, with certain parts thereof disassembled;

Figure 3:
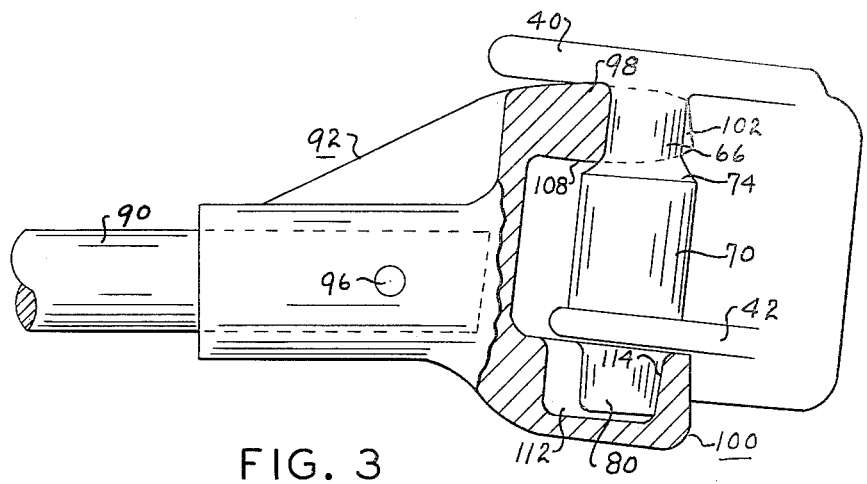
FIGURE 3 is an enlarged partial vertical cross sectional view of the present load equalizing hitch, taken on line 3—3 of FIGURE 1.
Figure 4:
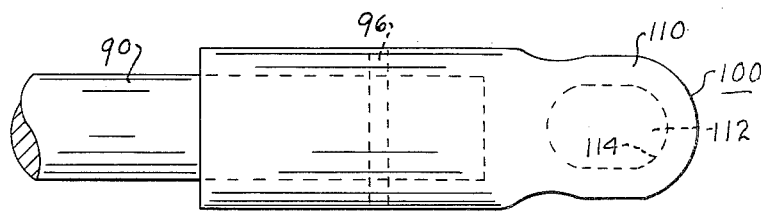
FIGURE 4 is an enlarged bottom view of the fixture used in conjunction with the present load equalizing hitch.
Figure 5:
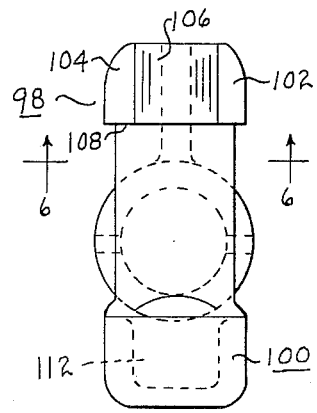
FIGURE 5 is an end view of the fixture shown in FIGURE 4.
Figure 6:
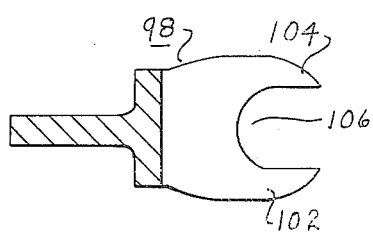
FIGURE 6 is a horizontal cross sectional view of the fixture shown in FIGURES 4 and 5, taken on line 6—6 of the latter figure.
Figure 7:
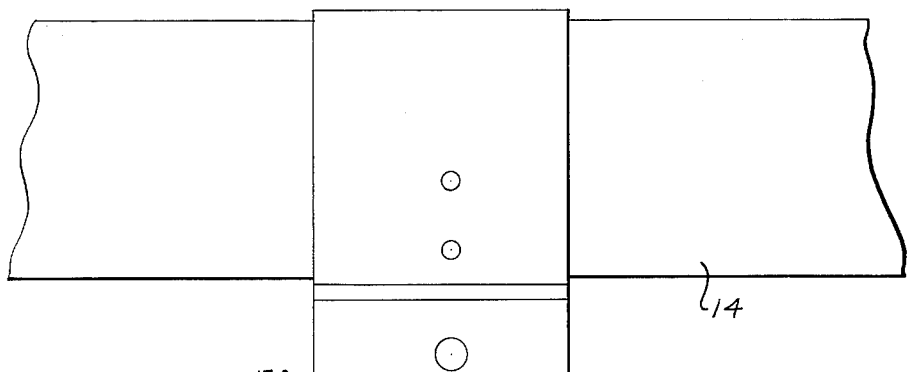
FIGURE 7 is a front elevational view of one of the stabilizers used in the present hitch, showing the stabilizer secured to the frame of a trailer.
Figure 8:
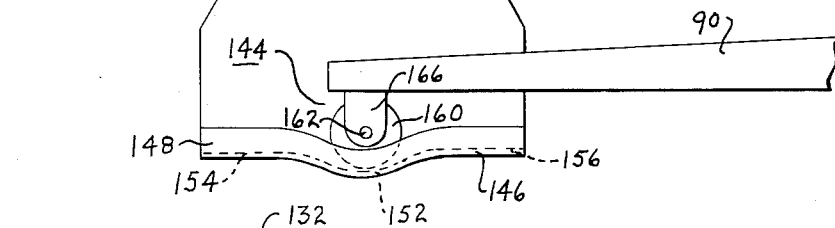
FIGURE 8 is a side elevational view of the stabilizer shown in FIGURE 7 and a cross sectional view of the trailer frame showing the manner in which the fixture is mounted on the frame and the manner in which it is used thereon.
Figure 8:
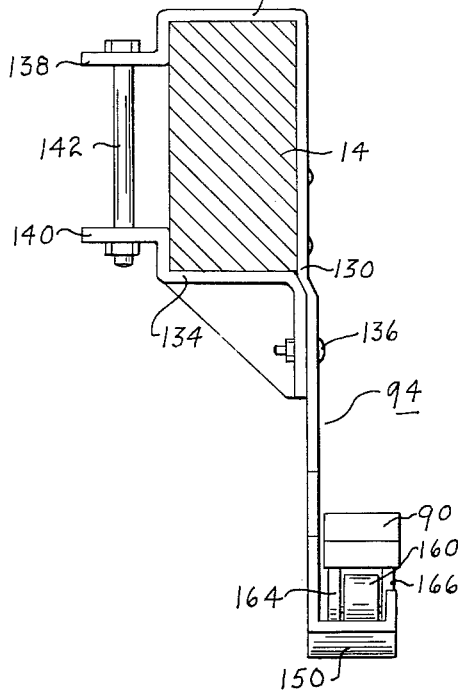

Referring more specifically to the drawings and to FIGURE 1 in particular, numeral 10 designates generally a trailer having angularly positioned frame members 12 and 14, preferably joined together at their forward end 16 by welding. The forward end of the frame members supports a plate 18 for a retractable parking wheel structure partially shown at numeral 20. The present load equalizing hitch is shown generally at numeral 22 and is connected to a towing vehicle, such as a conventional automobile, by a draw bar 24, the bar preferably being rigidly bolted at one end to the rear axle of the automobile and supported on the bumper at the other end by any suitable securing means. The rearward end of draw bar 24 includes a releasable attachment means 26 for the hitch. Various types of draw or tow bars may be used in conjunction with the present load equalizing hitch; however, the draw or tow bar for larger sized trailers should be firmly secured to the automobile, preferably to the rear axle thereof. A number of suitable draw bars with which the present hitch can be used are available on the market. The trailers on which the present hitch can be mounted may be of various sizes and constructions, and the members of the forward end of the frame may be parallel or they may be angular as shown in FIGURE 1. However, on the majority of the large trailers to which the present hitch is particularly applicable, the frame members are usually in the position shown. For the purpose of the present invention, the draw bar and trailer frame members are considered conventional and of well known construction, and will not be described in detail herein.

The present load equalizing hitch consists principally of ball mount bracket 30, spring bar assembly 32 and spring bar assembly 34. The bracket is constructed of metal and is provided with a cylindrical projection 36, extending forwardly from the bracket and received in attachment means 26, the projection 36 being held in attachment means 26 by a transversely positioned pin 38 extending through both the attachment means and the projection. This pin is readily removable from its position in the attachment means to permit the projection to be withdrawn therefrom when bracket 30 is being removed from the towing vehicle. The projection is preferably welded rigidly to bracket 30; however, this projection may be varied in construction from one bracket to another in order to adapt the present hitch to various types of tow or draw bar devices.

The bracket 30 consists of an upper horizontal support plate 40 and lower horizontal support members 42 and 44, the two members being joined rigidly to vertical support members 46 and 48, respectively, the latter two members in turn being joined rigidly to the underside of upper plate 40. This entire hitch bracket is preferably constructed of cast steel with the parts thereof being joined integrally to one another. Upper plate 40 contains a hole 50 for receiving a stem 52 of ball 54, the ball being held rigidly in place by a suitable securing means such as a pin or nut on the lower end of stem 52 beneath plate 40. The hitch bracket 30 together with projection 36 and ball 54 form the principal part of the towing vehicle part of the present hitch and can be used in this form in conjunction with conventional type socket means on the trailer, such as that shown at numeral 60, consisting of a cap 62 forming a socket for receiving ball 54 and having a latching mechanism 64 for retaining the ball in the socket while the trailer is being towed by the automobile.

The hitch bracket is provided with upper bearing members 66 and 68 joined rigidly at their upper ends to the underside of plate 40 and to the upper surface of members 42 and 44, respectively, by connecting members 70 and 72. Bearing members 66 and 68 are cylindrical in shape and are somewhat smaller in diameter than members 70 and 72 in order to provide the supporting shoulders 74 and 76, respectively. The hitch is provided with lower bearing members 80 and 82 projecting downwardly from the underside of support members 42 and 44, respectively, and being cylindrical in shape and joined rigidly to the respective support members. The cylindrical bearing members 66 and 80 and bearing members 68 and 82 are in axial alignment and of substantially the same diameter and are adapted to support one end of the spring bar assemblies 32 and 34.

The two spring bars 32 and 34 are identical in construction, each consisting of an elongated resilient steel bar 90, fixture 92 rigidly joined to one end of spring bar 90 and frame bracket assembly 94. Bar 90 may be of various shapes, in addition to that shown in the drawings, such as rectangular or round, and may be of various lengths and sizes depending upon the intended installation. Fixture 92 is rigidly secured to the end of bar 90 by rivet or pin 96 or by any other suitable securing means and consists of a yoke portion 98 and a socket portion 100, the yoke having two forwardly projecting arms 102 and 104 defining a U-shaped recess 106 for receiving one of the upper bearing members 66 or 68. The curvature of U-shaped recess 106 is substantially the same as the bearing members, and the recess is smaller than members 70 and 72 so that the lower edge 108 of yoke 98 will seat on and be supported by shoulder 74 or 76. Socket portion 100 consists of an outer wall 110 spaced downwardly from yoke 98 and defining an elongated recess 112, the elongation of the recess being parallel with the spring bar and the wall at the forward end of the recess forming a bearing surface for engaging the forward side of lower bearing members 80 or 82.

The spring bar assembly is mounted on the hitch bracket in the manner illustrated in FIGURE 3 with the inner surface of U-shaped recess 106 engaging the rear side of upper bearing member 66 or 68, and the forward side 114 of the wall defining recess 112 engaging the forward side of lower bearing member 80 or 82. In assembling the spring bar, socket portion 100 is first slipped upwardly onto lower bearing member 80 or 82 while the spring bar is tilted downwardly sufficiently to maintain the yoke and the upper bearing member in spaced relation. After the socket portion has been moved upwardly against support member 42 or 44, the spring bar is then tilted upwardly to place the yoke 98 around upper bearing member 66 or 68 with the rear surface of the latter bearing member against the inner surface of U-shaped recess 106. In order to remove the spring bar assembly from the hitch bracket, the reverse operation is performed.

After the spring bar assembly has been mounted on the hitch bracket in the foregoing manner, the rear or free end thereof is supported under tension by stabilizer assemblies 124 and 126 for the right and left spring bars, respectively. Each assembly consists of a rigid, vertically positioned member 130 having a horizontal portion 132 extending over the top of frame member 14 and downwardly a short distance on the opposite side of the frame member. The stabilizer is secured in place by a fixture 134 secured by bolt 136 or any other suitable securing means to vertical members 130 and extending beneath frame member 14 and upwardly along the inner side of the frame member. Both member 132 and fixture 134 have laterally extending flanges 138 and 140 with holes for receiving a bolt 142. When the bolt has been placed in the holes in flanges 138 and 140, the nut is tightened, thereby drawing member 132 and fixture 134 firmly against the top and bottom of the frame and rigidly securing the frame bracket to the frame.

Mounted on and preferably formed integrally with the lower end of member 130 is one element of a stabilizer assembly 144 consisting of a rigid, trough-like structure 146 having an upwardly extending outer flange 148 formed integrally and rigidly with bottom 150. The bottom of the trough structure is contoured to provide a recessed portion 152 near the center and elevated portions 154 and 156 at the two ends thereof. The other element of the stabilizer mechanism consists of a roller 160 journalled on pin 162 which in turn is supported by legs 164 and 166 joined rigidly and preferably integrally with the respective equalizing bars. The roller is positioned in trough structure 146 and rolls freely along the contoured bottom 150 as the towing and towed vehicle and trailer turn to the left and right. The recessed portion 152 represents the position of roller 160 in the trough structure when the towing and towed vehicle are traveling in a straight line, and the elevated portions 154 and 156 form a support for roller 160 when the towing and towed vehicles are turning to the right and left, respectively.

It is thus seen that as a right turn is made by the vehicles, the roller 160 rolls onto the elevated portion 154 of the trough structure, thus supplying greater tension on the equalizing bar 90, and, when the vehicles make a left turn, roller 160 rolls onto elevated portion 156, thus again placing additional tension on the equalizing bar. The present stabilizer mechanism provides an increased tension on the bar when the vehicles are negotiating turns, thus minimizing or completely eliminating rocking and swaying of the towed vehicle from side-to-side. Further, the stabilizer mechanism minimizes or completely eliminates the rocking and swaying created by whipping of the towed vehicle which sometimes results when the vehicles are traveling at a relatively fast rate and pass other large vehicles, such as semi-trailers and the like.

One of the advantages of the present stabilizing mechanism is its simplicity and reliability coupled with ease in

We claim:
1. A load equalizing and stabilizing hitch for connecting a trailer having a forwardly extending frame to a towing vehicle, comprising a bracket, means for attaching said bracket to the towing vehicle, bearing members mounted on said bracket and spaced laterally from one another, a ball member mounted on the upper portion of said bracket, a member mounted on the trailer for engaging said ball member, a spring bar assembly for each laterally disposed bearing member, each assembly including an elongated resilient steel bar, a fixture on one end of said bar for engagement with said bearing members, a stabilizing mechanism at the other end of each of said bars, each of said mechanisms including a trough-like track positioned horizontally and parallel to the respective bar, a rigid support member connected to said track and extending upwardly therefrom, a means for rigidly and removably attaching said support member to the trailer frame, a roller for said track, and a means for rotatably attaching said roller to the bar for movement on said track as the towing vehicle and trailer turn right and left, said track having a curvature such that when said roller is in the center thereof said bar is at its lowest position relative to said trailer frame.

2. A load equalizing and stabilizing hitch for connecting a trailer having a forwardly extending frame to a towing vehicle, comprising a bracket, means for attaching said bracket to the towing vehicle, a spring bar assembly on each side of said bracket including an elongated resilient bar, a fixture on one end of said bar for pivotally attaching said bar to said bracket on a vertical axis, a stabilizing mechanism at the other end of each of said bars, each of said mechanisms including a track positioned horizontally and parallel to the respective bar, a rigid support member connected to said track and extending upwardly therefrom, means for rigidly and removably attaching said support member to the trailer frame, a roller means for said track, and a means for attaching said roller means to the bar for movement on said track as the towing vehicle and trailer turn right and left, said track having a curvature such that when said roller means is in the center thereof, said bar is at its lowest position relative to the said trailer frame.

3. In a load equalizing and stabilizing hitch for connecting a trailer to a towing vehicle, having a bracket, means for attaching said bracket to the towing vehicle, a spring bar assembly on each side of said bracket, including an elongated resilient bar, and means on one end of said bar for pivotally attaching said bar to said bracket on a vertical axis: a stabilizing mechanism at the other end of each of said bars, each of said mechanisms including a track positioned horizontally, a rigid support member connected to said track and extending upwardly therefrom, means for rigidly attaching said support member to the trailer, a contact member for said track, and a means for attaching said contact member to the bar for movement on said track as the towing vehicle and trailer turn right and left, said track having a curvature such that when said contact means is the center thereof, said bar is at its lowest position relative to the trailer.

4. In a load equalizing and stabilizing hitch for connecting a trailer to a towing vehicle, having a bracket, means for attaching said bracket to the towing vehicle, bearing members mounted on said bracket and spaced laterally from one another, a spring bar assembly on each side of said bracket including an elongated resilient bar, and a fixture on one end of said bar for engagement with said bearing members for pivotally attaching said bar to said bracket on a vertical axis: a stabilizing mechanism at the other end of each of said bars, each of said mechanisms including a track positioned horizontally, a rigid support member connected to said track and extending upwardly therefrom, means for rigidly attaching the support member to the trailer, a contact member for said track, and a means for attaching said contact member to the bar for movement on said track as the towing vehicle and trailer turn right and left, said track having a curvature such that when said roller means is in the center thereof, said bar is at its lowest position relative to the trailer.

5. In a load equalizing and stabilizing hitch for connecting a trailer having a forwardly extending frame to a towing vehicle, having a bracket, means for attaching said bracket to the towing vehicle, a spring bar assembly on each side of said bracket including a bar, and means on one end of said bar for pivotally attaching said bar to said bracket on a vertical axis: a member adjacent the other end of each of said bars adapted to be connected to the trailer frame to extend rigidly downwardly therefrom, a member attached to said bar near the end thereof opposite said pivot means, a trough-like track means on one of said members positioned substantially parallel with the bar, and a roller means attached to the other of said members for engaging said track, said track having a curvature such that when said roller means is in the center thereof, said bar is at its lowest position relative to the trailer frame.

6. In a load equalizing and stabilizing hitch for connecting a trailer to a towing vehicle, having a bracket, means for attaching said bracket to the towing vehicle, a spring bar assembly on each side of said bracket including a bar, and means on one end of said bar for pivotally attaching said bar to said bracket on a vertical axis: a member adjacent the other end of each of said bars adapted to be connected to the trailer and to extend rigidly downwardly, a member attached to said bar near the end thereof opposite said pivot means, a track means on one of said members positioned substantially parallel with the bar, and a roller-like means attached to the other of said members for engaging said track, said track having a curvature such that when said roller means is in the center thereof, said bar is at its lowest position relative to the trailer frame.

References Cited by the Examiner
UNITED STATES PATENTS

| | | | |
|---|---|---|---|
| 2,345,270 | 3/44 | Lavoie | 267—56 |
| 2,597,657 | 5/52 | Nathisen | 280—406 |
| 2,898,124 | 8/59 | Bernard et al. | 280—406 |
| 2,952,475 | 9/60 | Reese | 280—406 |
| 2,986,389 | 5/61 | Coonrod | 267—56 |
| 3,151,879 | 10/64 | Beck | 280—406 |

BENJAMIN HERSH, *Primary Examiner.*

A. HARRY LEVY, *Examiner.*

Disclaimer 3,206,224.—*Gerald L. Bock* and *Charles Weber*, Elkhart County, Ind., TRAILER HITCH. Patent dated Sept. 14, 1965. Disclaimer filed Mar. 14, 1969, by the assignee, *Elkhart Welding and Boiler Works, Inc.*

Hereby enters this disclaimer to claims 1 and 2 of said patent.

[*Official Gazette July 8, 1969.*]